United States Patent [19]
Webb et al.

[11] Patent Number: 4,706,194
[45] Date of Patent: Nov. 10, 1987

[54] MULTIPLEX CONTROL SYSTEM FOR MEMORY SEAT OR THE LIKE LOAD

[75] Inventors: Nathaniel Webb, Detroit; David L. Juzswik, Dearborn Heights, both of Mich.

[73] Assignee: United Technologies Automotive, Inc., Dearborn, Mich.

[21] Appl. No.: 808,702

[22] Filed: Dec. 13, 1985

[51] Int. Cl.$^4$ .......................... B60N 1/02; G06F 15/20
[52] U.S. Cl. .................................... 364/424; 318/466; 296/65 R
[58] Field of Search ....................... 364/424, 425, 174; 318/466, 467, 468, 603; 296/65 R

[56] References Cited

U.S. PATENT DOCUMENTS

| | | | |
|---|---|---|---|
| 4,204,255 | 5/1980 | Cremer | 364/425 |
| 4,401,928 | 8/1983 | Kamijo et al. | 318/468 |
| 4,404,632 | 9/1983 | Harada et al. | 318/466 |
| 4,434,468 | 2/1984 | Caddick et al. | 318/466 |
| 4,451,887 | 5/1984 | Harada et al. | 364/425 |
| 4,510,426 | 4/1985 | Michaels et al. | 318/603 |

Primary Examiner—Gary Chin
Attorney, Agent, or Firm—Stephen A. Schneeberger

[57] ABSTRACT

An improved control system is provided for controlling the variable characteristic associated with automotive peripheral devices, such as seats, mirrors, seat bladders or the like, having a "memory" capability. The control system avoids overloading a central controller and/or a data link between the central controller and the device being controlled, by approximating the "run" interval required to vary the relevant characteristic, i.e. seat position, from its present value to a target value recalled from memory. Pulses are generated by variations in the seat position and accumulated in a counter which may be separate from the central controller. At the completion of a "run" for the approximated interval, the accumulated count is used to update a count representative of the "present" seat position. The updated position is again compared to the target position and, if it differs by more than some acceptable tolerance, a new interval is determined and is "run". Provision may be made to compensate the determination of the interval for changes in the rate at which the seat responds.

22 Claims, 8 Drawing Figures

MULTIPLEX CONTROL SYSTEM FOR MEMORY SEAT OR THE LIKE LOAD

TECHNICAL FIELD

The invention relates to a control system for a device having a variable characteristic and more particularly to a multiplex control system for a memory seat or the like.

BACKGROUND ART

Various devices in automoiles and other similar carriers are provided with a so-called "memory" capability. Perhaps the best known of these devices is the memory power seat in an automobile. There, one or more predetermined positions for the seat are determined and set in a memory by the operator. Subsequent actuation of a particular "recall" switch serves to automatically move the seat from its present, or actual, position to the selected, or recalled, position stored in memory. A powered automobile seat typically is moved along or around three or more axes by respective motors, and a memory system may operate to automatically position the seat anywhere within the range of travel embraced by those motors and their associated drive systems. Examples of such memory seat control systems may be found in U.S. Pat. Nos. 4,434,468; 4,463,426 and 4,510,426. In each of the memory seat systems disclosed by those patents, a sensor is associated with each of the drive motors or the associated driving apparatus for providing pulses indicative, either directly or indirectly, of variations in the position of the associated drive train and thus, the seat. In addition to automobile seats being provided with a "memory" capability, other devices such as mirrors and the like may also automatically be positioned to locations previously stored in a memory associated with the control. Still other devices within an automobile may possess a characteristic which may be physically varied by electronic control, which characteristic is capable, directly or indirectly, of being stored in and recalled from a memory. One example of this latter type of device includes the variably-inflatable air bladders which may be placed in an automobile seat for adjusting contour and firmness.

The electronic control systems associated with the aforementioned type memory devices, and particularly the memory seat controls systems described in the aforementioned patents, advise the central control system of the actual position of the seat drive apparatus on a substantially continuous basis. Thus, if a position pulse is generated for each revolution of a drive motor, that pulse is immediately entered and counted in the central controller such that that controller constantly knows the position of the seat and may stop its motion when it arrives at the "recalled" position. While such arrangement is readily possible in a system in which all of the logic and circuitry associated with the control is dedicated only, or nearly only, to the control of the memory seat, such may not be the case where the control circuitry is called upon to control a number of functions, as for example in the multiplex control systems being developed to serve a relatively large number of diverse automobile body electrical functions. Examples of such vehicle multiplex control systems are found in U.S. Pat. Nos. 4,528,662 and 4,534,025, assigned to the same assignee as the present application. In those multiplex control systems, a variety of inputs and outputs associated with the vehicle electrical system are extended respectively to and from the central controller via one or more remote controllers, or "remuxes", and a connected serial multiplex link. The serial data link uses time division multiplexing for passing signals between the remuxes and the central controller. Because a large number of other loads may need to be serviced in such a system and because some may have a higher priority than others, it may be difficult or impossible to include a practical memory seat capability in the multiplex system due to the high traffic on the line and the requirement of the prior art systems to have substantially continuous access to their central controller.

DISCLOSURE OF THE INVENTION

It is a principal object of the present invention to provide a multiplex control system which affords, in a relatively practical manner, a "memory" capability for one or more peripheral devices associated therewith.

It is another object of the invention to provide an improved memory seat control system which is readily incorporated in a multiplex vehicle control system in a practical manner.

According to the invention there is provided an improved control system for varying the characteristic of a first peripheral device, such as the drive mechanism for an automobile seat, a mirror, a seat bladder or the like, in a time dependent manner in response to an output signal from a central controller. The central controller includes a memory which stores a target value and an actual value of the variable characteristic of the peripheral device. A sensor provides signals indicative of variations in the characteristic of the peripheral device. Another peripheral device of a different type is capable of providing a recall input command signal, and the central controller is responsive to that recall input command signal for providing an output signal to a motor associated with the first peripheral device for varying its characteristic in a manner to attain the target value stored in memory.

The improvement broadly resides in structuring and programming the control system such that it is unnecessary to substantially continuously monitor the status of the variable characteristic of the peripheral device and substantially continuously compare that status with the target value. This is accomplished by having the central controller determine an interval which aproximates the time required to vary the characteristic from its present value to the target value. This determination is based on an assumption that the characteristic is varied at a certain rate, however, provision may be made for compensating the rate assumption. Provision is made for determining the value of accumulated variation in the characteristic at the end of a run interval and for using that value to update the so-called present value, which is then used to determine a new run interval, if necessary.

The improved control system finds particular utility in an arrangement in which one or more remote controllers are connected to the central controller by a serial multiplex data link, and each of the various peripheral devices is connected to the central controller through the remote controllers. To avoid overloading the multiplex data link, the central controller is structured and programmed such that it is responsive to the recall input command signal for comparing the actual value with the target value of the variable characteristic to determine a difference value, and for determining an interval which approximates the time required for the motor of the first peripheral device to vary the device characteristic by the difference value, and for applying the output signal to the motor for the determined interval by latching the output signal at the remote controller for that interval.

In the exemplary embodiment of a memory seat for an automobile, there exist several peripheral devices with variable characteristics, each including a respective bidirectional motor for positioning a part of the seat. Correspondingly, there exist associated sensors, such as Hall-effect or inductive-type sensors, for monitoring displacement of the seat drivetrain and providing pulses indicative thereof. the pulses are accumulated in respective counters. Following each run of a motor for its determined interval in an effort to attain the target value, the count accumulated in a counter during that run is delivered, via a remote controller, to the central controller where it updates a stored value indicative of the actual position of the mechanism. That updated actual value is then again compared with the target value to determine whether the target has been attained, and if not, whether it is within an acceptable tolerance, i.e. plus or minus eight counts in this embodiment. If an error remains, as represented by the difference value, a new interval is determined and one again an output signal is latched at the output of an appropriate remote controller for running the respective motor for that interval. The counter is reset at the beginning of each motor run.

In a basic embodiment, the central controller determines the interval dependent upon a preselected rate at which the motor is presumed to vary the device characteristic, and that preselected rate is treated as a constant. As one alternative to that arrangement, some compensation is provided for the situation in which variations in the weight of the load, as of a person on the seat, occasion changes in the rate at which the motor varies the seat's response. This is done by sensing the weight on the seat and using the resulting value in the determination of the motor-run interval.

As an alternative to both of the foregoing embodiments, it is recognized that other factors in addition to weight will affect the rate of motor response, both short term and long term. Accordingly, a nominal base rate is initially presumed and the actual rate of response determined during one or more subsequent motor runs is used to adjust the assumed rate for subsequent interval determinations. Preferably, the actual rate occurring in the first run following a recall command is used to update the base rate and each actual rate determined during a run is used to determine the interval of the next subsequent run during that recall. These adaptive alternatives seek to position the seat in as few run operations as possible to provide the sensation of smooth and continuous operation.

BEST MODE FOR CARRYING OUT THE INVENTION

Figure 1:
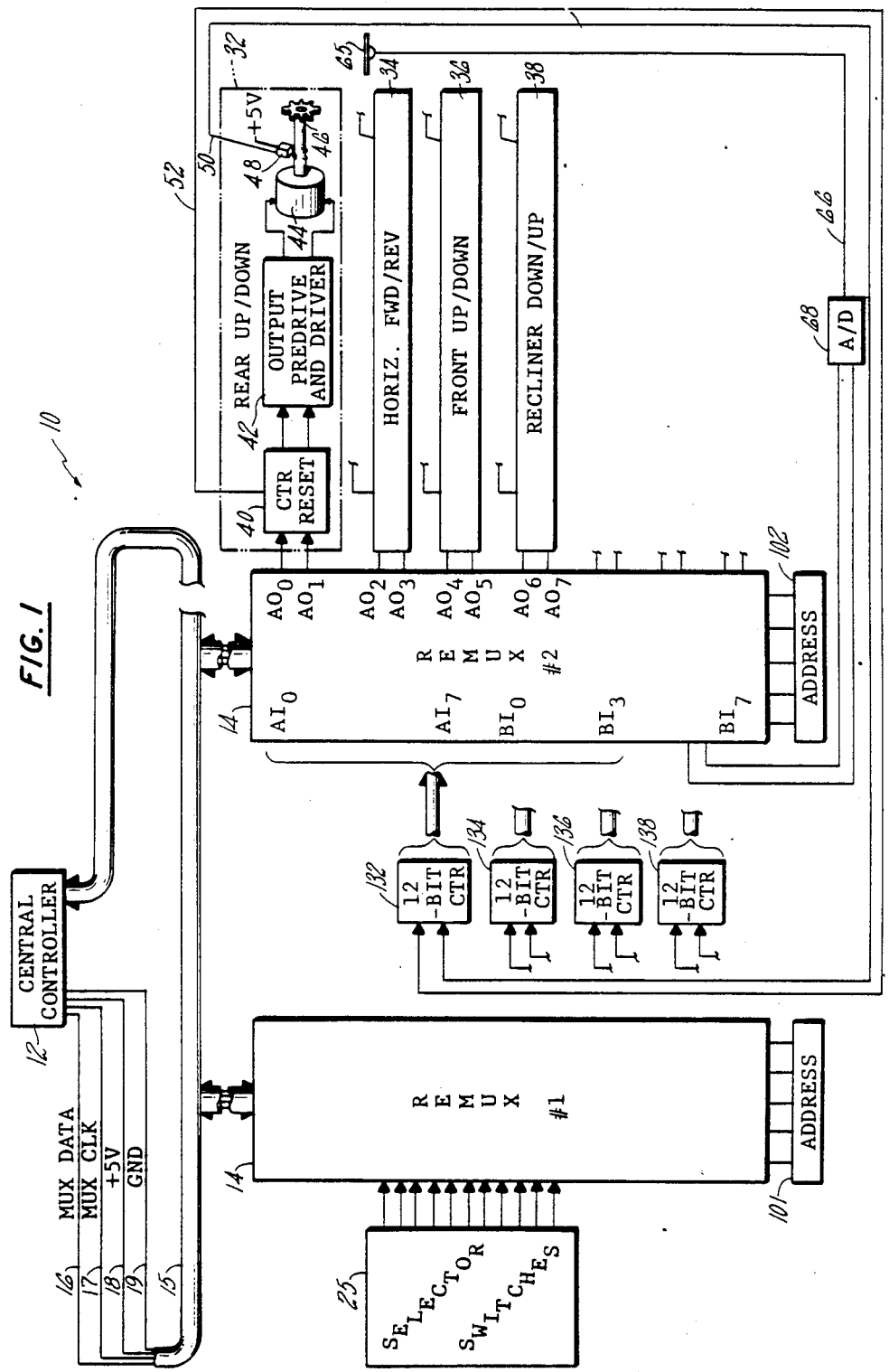
FIG. 1 is a functional block diagram of a multiplexed memory seat control system in accordance with the invention.

Although the multiplexed control system of the invention will be described in the context of use with a memory seat, it should be understood that other "memory"-type loads such as mirrors, windows, air bladders and the like, might be substituted or included. Referring to FIG. 1, there is illustrated an architectural block diagram of the control system 10 incorporating the present invention. The control system 10 employs a multipelx communication system of the type described in the aforementioned U.S. Pat. Nos. 4,528,662 and 4,534,025, which patents are incorporated herein by reference. Briefly, the control system 10 includes a central controller 12, one or more remote multiplex controllers, or "remuxes", 14 at various remote locations about a vehicle, and a four-wire communication bus 15 serving to interconnect the central controller 12 and the various remuxes 14. The bus 15 includes a first wire 16 for carrying bidirectional, serial, time division multiplexed data (MUX DATA), a second wire 17 for conveying the serial muliplex clock (MUX CLK), a third wire 18 for extending a +5 volt DC supply voltage to the central controller 12 and the remuxes 14 and a fourth wire 19 which serves as a signal ground (GND) for the control system 10. Although the multiplex communication bus 15 between the central controller 12 and the various remux controllers 14 might in some applications be open ended, with the central controller being located at one end and the various remux controllers 14 tapping in parallel "T" connection to the conductors 16-19 along the length of the bus, it is shown in the present invention in the form of a loop which is terminated at its opposite ends or terminals by different portions of the central controller 12 to provide increased integrity and security.

A variety of peripheral devices are connected to the remuxes 14 to provide inputs to, or receive outputs from, the central controller via the remuxes. In a typical instance, one peripheral device might be a switch for providing an input command to the control system 10. A number of selector switches, cumulatively represented by reference numeral 25, provide individual inputs to one of the remuxes 14, hereinafter designated Remux 1. Each of the inputs represents a "peripheral device" which is capable of making a demand on the operating cycle time of the multiplex control system 10. Another Remux 14, hereinafter referred to as Remux 2, is illustrated as having connected thereto not only peripheral devices of an input nature, but also peripheral devices of an output character. As used herein, the term "peripheral device", or simply "peripheral", is intended to include not only an electronic element directly providing an input to or receiving an output from a Remux 14, but also to broadly include the entire apparatus which provides or utilizes that output. For instance, Remux 2 is depicted as having four output-type peripheral devices 32, 34, 36 and 38, each of which utilizes a pair of outputs from Remux 2. Specifically, peripheral 32 includes the mechanism for moving the rear portion of an automobile seat up or down; peripheral 34 includes the mechanism for moving the seat horizontally, in a forward or reverse direction; peripheral 36 includes the mechanism for moving the front of the seat up or down and peripheral 38 includes the mechanism for moving the seat recliner either down or up. Each of the peripherals 32, 34, 36 and 38 utilizes a pair of outputs from Remux 2 to provide bidirectional motion. It will be understood that a single remux output is capable of controlling unidirectional motion.

Referring to the peripheral 32 of FIG. 1 in greater detail, it includes counter reset circuitry 40, appropriate driver circuitry 42 for controlling the application of electrical power to a bidirectional DC motor 44, a drivetrain mechanism 46 which is rotated by motor 44 to move the rear of a seat up or down, and a sensor, such as Hall-effect sensor 48, for providing pulses on line 50 which are indicative of the displacement of motor 44 and drivetrain 46. Each of the other output peripherals 34, 36 and 38 is structured in a manner similar to that of peripheral 32. The pulses from Hall-effect sensor 48 are extended via lead 50 to the Clock input of a 12-stage counter 132. Reset pulses from the counter reset circuitry 40 are extended via lead 52 to the Reset input of the counter 132. Most or all of the 12 outputs of the counter 132 are extended to respective inputs on Remux 2 for relay, via bus 15, to the central controller 12.

A pressure transducer 65 is associated with the seat base being controlled by the peripherals 32, 34 and 36 to approximately determine the weight of a load, such as a human, on that seat. The analog signal developed by pressure transducer 35 is extended via lead 66 to appropriate analog-to-digital circuitry 68 for conversion to a three-bit digital signal for input to the Remux 2 for a purpose to be hereinafter described.

Each of the remuxes 14 in control system 10 includes its own unique address, the address for Remux 1 being provided by address circuit 101 and the address for Remux 2 being provided by address circuit 102. A preselected, different, seven-bit address is wired into each of the address circuits 101 and 102.

Figure 2:
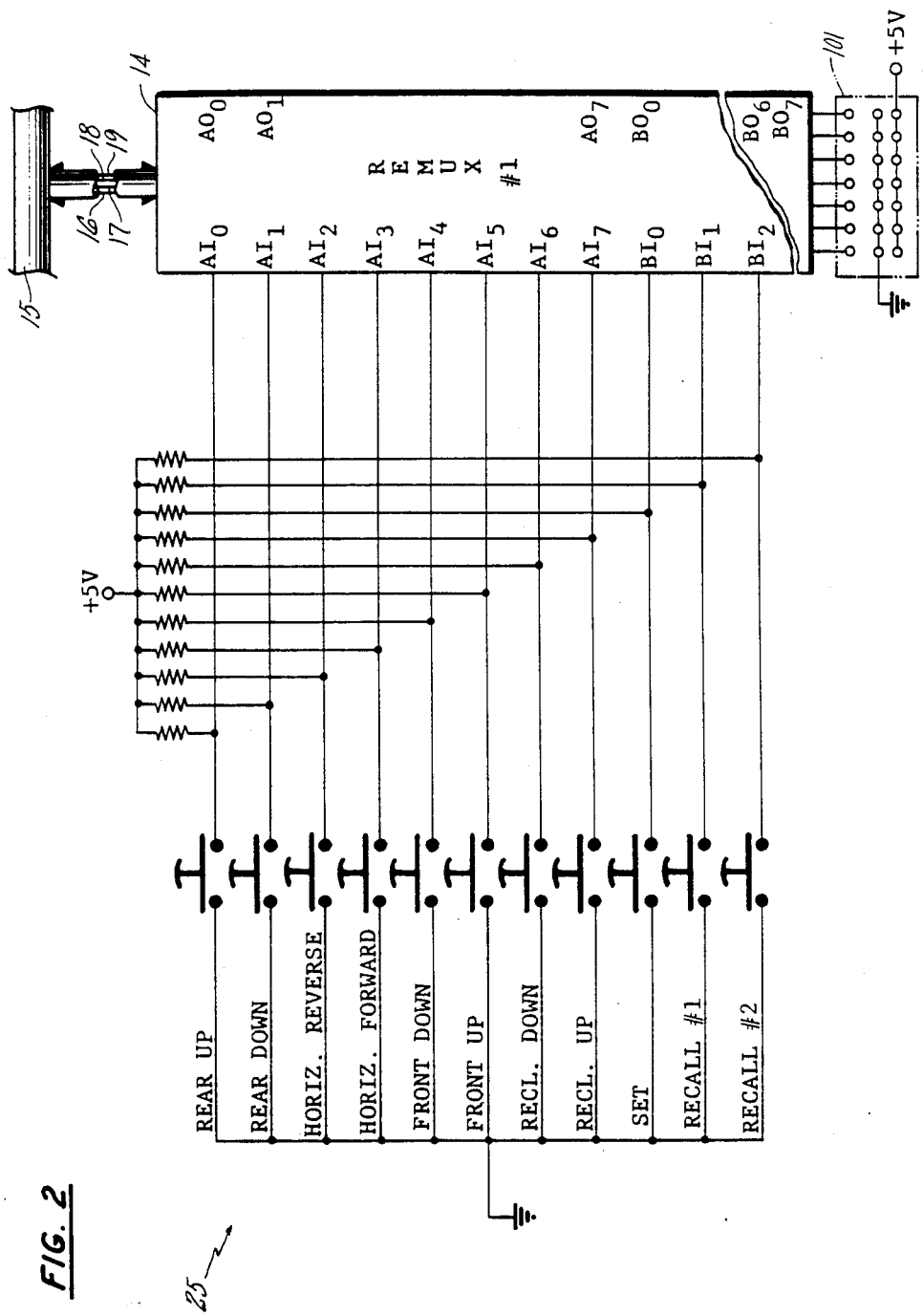
FIG. 2 is a more detailed schematic diagram of part of the control system depicted in FIG. 1.
Figure 3:
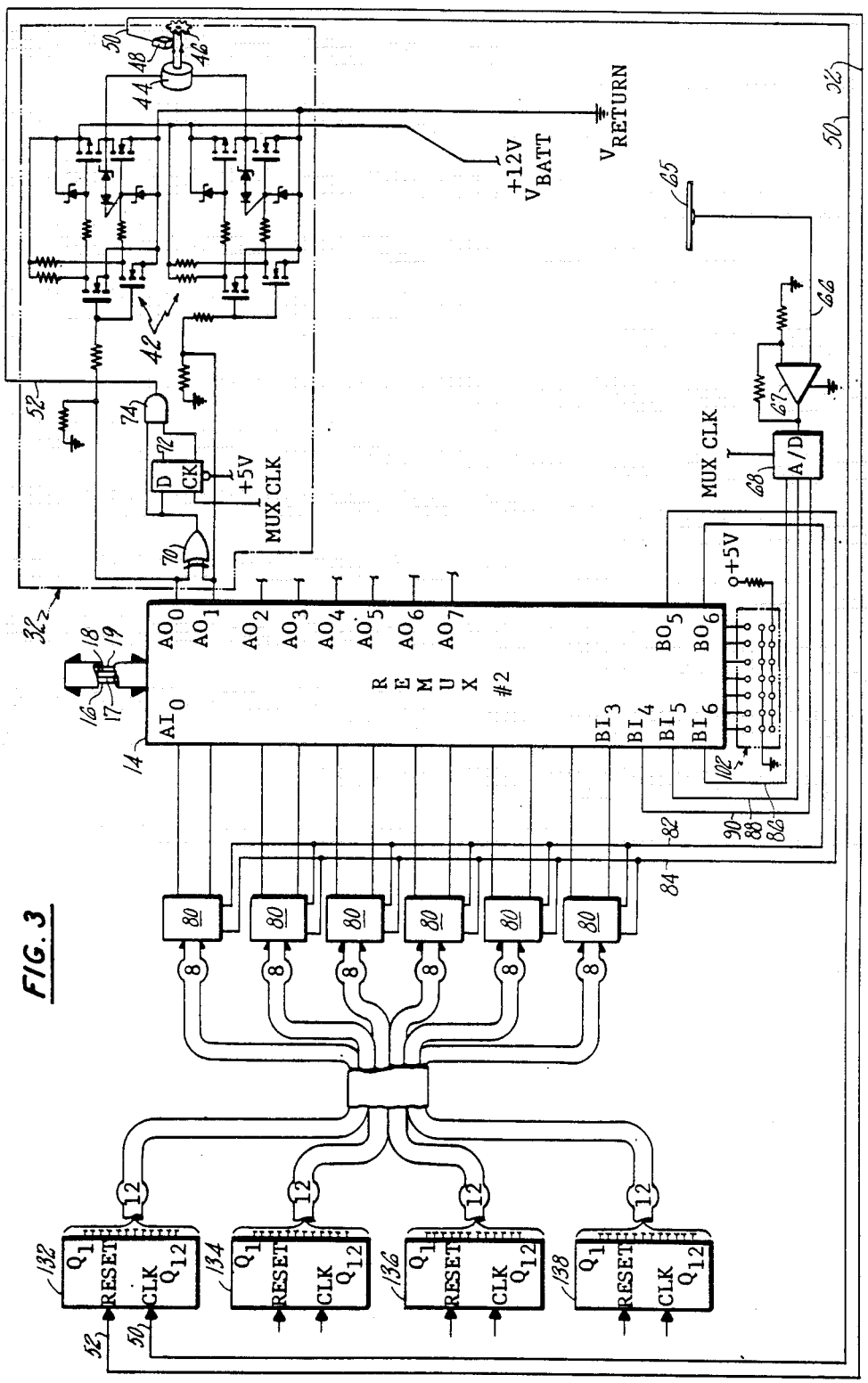
FIG. 3 is a more detailed schematic diagram of the remainder of the control system depicted in FIG. 1.

Reference is made to FIGS. 2 and 3 for a more detailed illustration of the circuitry associated with Remux 1 and Remux 2, respectively. Referring to FIG. 2, the selector switches 25 include eight normally-open switches of the momentary contact type which, while actuated to their closed position, operate to provide input command signals to effect certain output responses. As depicted in FIG. 2, those eight switches included REAR UP, REAR DOWN, HORIZONTAL REVERSE, HORIZONTAL FORWARD, FRONT DOWN, FRONT UP, RECLINE DOWN and RECLINE UP. Three further switches include a SET switch, a RECALL #1 switch, and a RECALL #2 switch. These latter three switches are normally open and of the momentary contact type, and need only be closed momentarily to effect the requisite input commands.

In the illustrated embodiment, the remuxes 14, i.e. Remux 1 and Remux 2, are of the type described in the aforementioned patents, U.S. Pat. No. 4,534,025 and particularly U.S. Pat. No. 4,528,662. Each remux includes ports for 16 inputs, i.e. $AI_0$–$AI_7$ and $BI_0$–$BI_7$ and 16 outputs, i.e. $AO_0$–$AO_7$ and $BO_0$–$BO_7$. The input switches described in the FIG. 2 embodiment require only 11 inputs. The various outputs of Remux 1 are shown as being unused, however, it will be appreciated that they are available for a variety of related or unrelated uses.

Referring to FIG. 3, a representative one of the peripheral devices 32 is illustrated in greater detail, however, it will be understood that each of the other peripherals 34, 36 and 38 includes substantially identical circuitry and motorized drivetrains. Output ports $AO_0$ and $AO_1$ of Remux 2 provide the control signals for driving the motor 44 in opposite directions for moving the rear of the seat in an upward or downward direction. Normally both outputs $AO_0$ and $AO_1$ are in the same state, i.e. logic 0, for maintaining motor 44 in an "off" condition. However, if the motor is to be rotated in one direction, one of those two outputs is set to a logic 1 and conversely, if rotation in the other direction is required the other output is set to a logic 1. The counter reset circuit 40 of FIG. 1 comprises EXCLUSIVE OR gate 70, D-flip-flop 72 and AND gate 74 for providing a reset pulse on lead 52 of approximately 40 microseconds duration when one of the outputs $AO_0$ or $AO_1$ switches to a logic 1 state to begin actuation of motor 44. The reset pulse is extended via lead 52 to the Reset input of 12-bit counter 132.

The Remux 2 outputs $AO_0$ and $AO_1$ are each extended to appropriate predrive and drive control circuitry, designated 42, which controls the application of a motor driving potential, $V_{batt}$ and $V_{return}$, to the appropriate terminals of motor 44. The potentials $V_{batt}$ and $V_{return}$ are representative of the vehicle's 12 volt DC battery supply. The drive circuitry 42 effectively provides the power switching for the terminals of the motor 44 and is controlled by the respective outputs $AO_0$ and $AO_1$. In the illustrated embodiment the drive circuitry is principally comprised of power FETs, but may also comprise elecromechanical relays or other known power switching devices.

The drivetrain 46 rotated by motor 44 is configured to interact with Hall-effect sensor 48 in a manner which provides four pulses per revolution of the motor. In an exemplary powered seat system, the motor 44 and the related motors in peripheral devices 34, 36 and 38 must typically make between 100 and 200 revolutions to describe the full range of seat travel along or around the particular axis, depending upon the particular motor and drivetrain. Thus, the maximum number of pulses along a particular axis is typically less than about 1,000. Also, the motor 44, when relatively unloaded, typically completes a revolution in about 26 ms such that it can complete 200 revolutions in about five seconds if uninterrupted. It will be appreciated that other kinds of sensors than the Hall-effect sensor 48 may be used to sense displacement effected by motor 44, with the aforementioned U.S. Pat. Nos. 4,434,468; 4,463,426 and 4,510,426 providing some examples. Moreover, if the peripheral device is of a type in which the sensed variable characterstic is other than displacement, as for instance fluid pressure, a suitable transducer may be used to sense such variation.

The displacement sensor output 50 is extended to the Clock input of 12-bit counter 132. Following resetting by the reset pulse 52, that counter will begin to accumulate a count at a rate determined by the frequency of the pulses generated by the Hall-effect transducer 48. The capacity of the counter 132 is greater than the maximum number of counts possible for the maximum range of travel of the peripheral device 32. The 12 outputs of counter 132 (or fewer if not all 12 are necessary) are extended to 12 respective inputs $AI_0$–$BI_3$ on Remux 2.

In the embodiment of FIG. 3, because it is also necessary to connect the 12 outputs of each of the additional counters, 134, 136 and 138 to those same inputs on Remux 2, six conventional 4-to-1 data selectors or multiplexers 80 are provided. The multiplexers 80 are of the type 74HC153 made by Texas Instruments and include eight inputs and two outputs. Each of the 12 outputs of each of the counters 132, 134, 136 and 138 is fanned such that two leads extend as inputs to each of the six multiplexers 80. The selection of which pair of inputs to a multiplex circuit 80 are to appear at its output, and thus at the input to Remux 2, is determined by a pair of leads 82 and 84 from the outputs $BO_5$ and $BO_6$ of Remux 2 and connected to the pair of selection control inputs of each of the multiplexers 80. By sequencing the possible binary codes on outputs $BO_5$ and $BO_6$, the counts of each of the four counters 132, 134, 136 and 138 may be inputted to Remux 2 in a sequential manner.

The analog signal appearing on lead 66 from pressure transducer 65 is extended through a noninverting amplifier 67 to A-to-D converter 68. A-to-D converter 68 is structured to divide the load range into eight parts, as represented by the three-bit binary code appearing on leads 86, 88 and 90 extended to inputs $BI_4$, $BI_5$ and $BI_6$, respectively of Remux 2. That three-bit digital code provides an indication of the load or weight on the seat.

Each of the remuxes 14 is capable of debouncing that various signals appearing at the inputs and of latching the various logic states appearing at the output. The central controller 12 contains most of the logic and memory associated with the control system 10. It will also be understood that the read-only-memory associated with central controller 12 contains the stored program necessary to effect overall operation of the control system 10, including the memory seat routine to be hereinafter described. Additionally, central controller 12 includes the necessary random-access-memory for providing the requisite counting, timing and arithmetical processes required in conjunction with the operating routine to be described.

Figure 4:
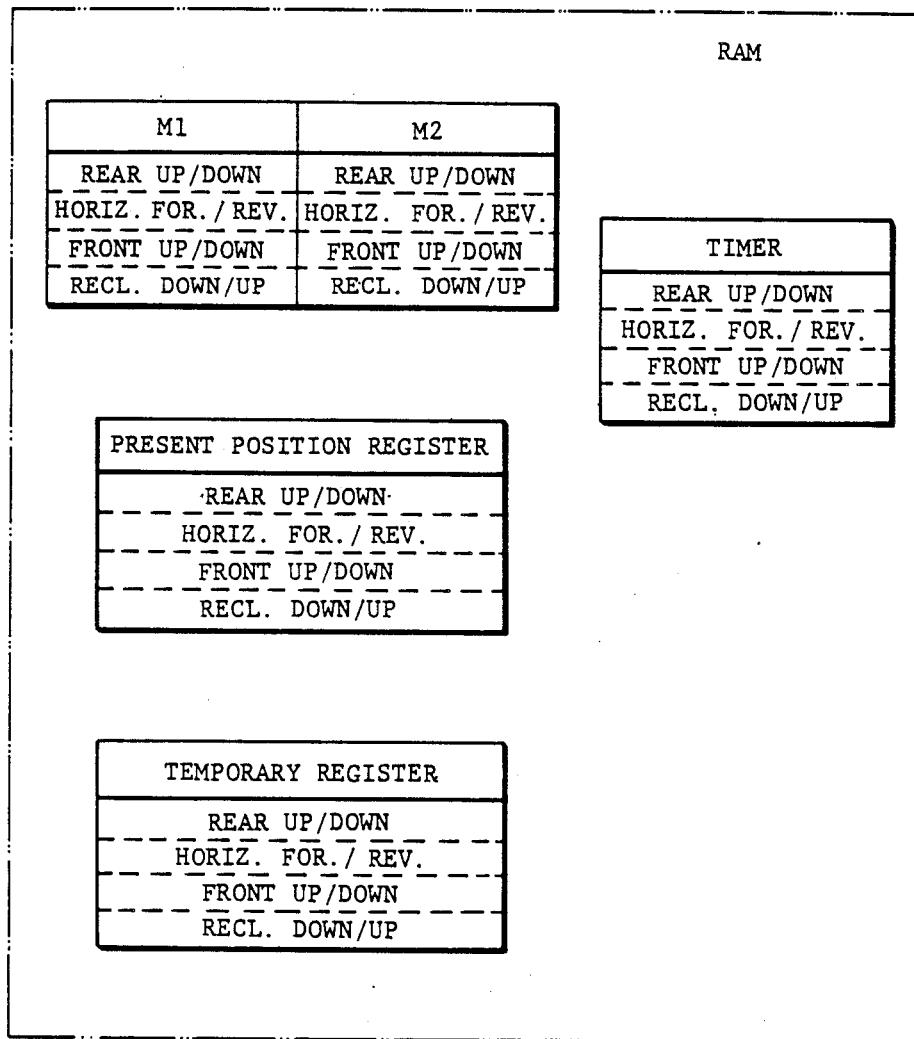
FIG. 4 is a descriptive block diagram of a portion of the control system memory.

Reference is made to the descriptive block diagram of FIG. 4 which depicts certain portions of the random access memory (RAM) located within the central controller 12 which are used for particular functions in effecting control under the present invention. One portion of the RAM is committed to the storage of positional data associated with a first memory seat position, M1, and with a second memory seat position, M2. For each of these memory seat positions, positional data will be entered and stored for each of the four axes along which, or about which, seat displacement occurs. Similarly, four 16 bit PRESENT POSITION REGISTERS are provided for storing the positional data of the "present" or "actual" position of the respective drive mechanisms. Still further, four 16 bit TEMPORARY REGISTERS are provided for temporarily storing respective counts representative of the magnitude of displacement of a respective drive mechanism during one run operation. The RAM also includes four TIMERS, each comprised of a 16-bit register and associated with a respective one of the drive mechanism for measuring a respective operating interval.

Figure 5A:
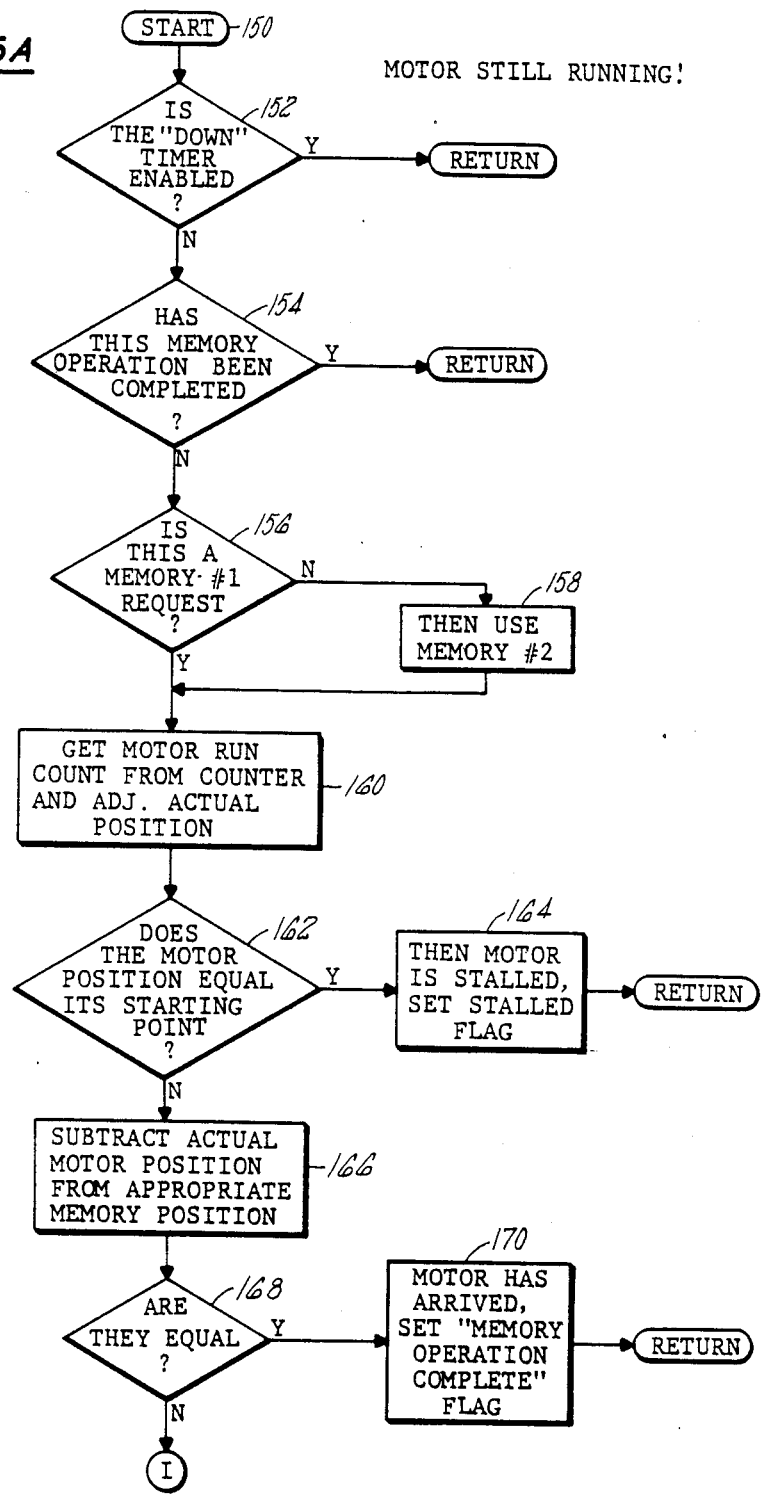
FIGS. 5A and 5B are the flow diagrams of the basic control routine in accordance with the invention.
Figure 5B:
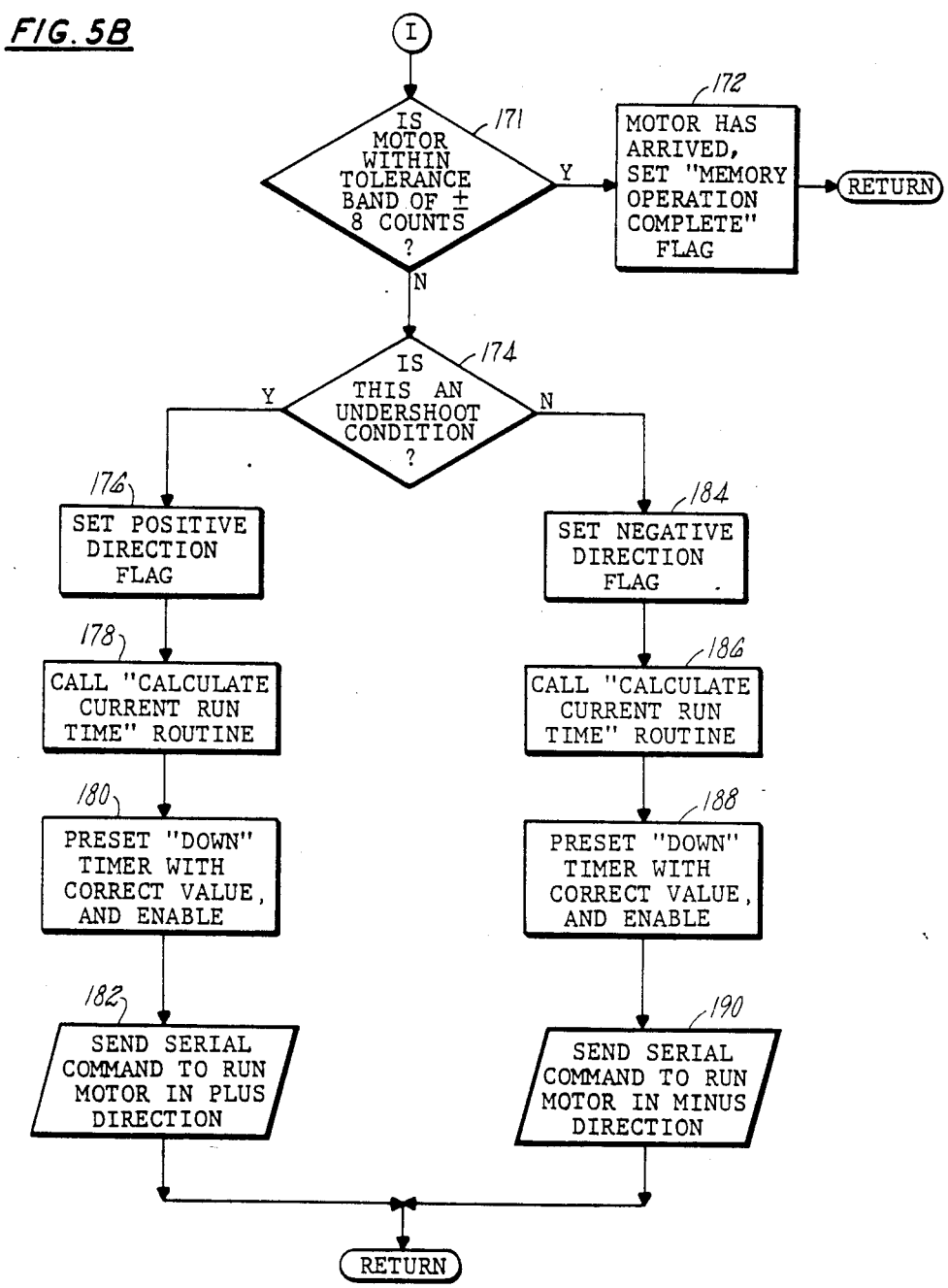

The basic operation of the control system 10 is described in accordance with the invention and as generally depicted in FIG. 5. Assuming either that the seat driving mechanism are initially driven to respective limit positions and such position consitutes a zero reference point, or that the various memories are sufficiently large that a random starting position may be selected as the zero reference point, the seat may be manually driven or powered to any position by closing the appropriate ones of the eight positioning switches depicted in FIG. 2.

Each time the seat is moved, the reset circuitry, i.e. 40, associated with a particular motor being operated, i.e. 44, operates to generate a reset signal, i.e. 52, for reseting the respective counter, i.e. 132, and the respective sensor, i.e. 48, provides pulses which are supplied to the respective counter, i.e. 132, for developing a count which is indicative of the magnitude of the respective seat drive mechanism, i.e. 46, from the time that motor is operated until it stops. Upon completion of a seat positioning movement, the count accumulated in the respective counter is entered, via Remux 2, into an appropriate TEMPORARY REGISTER in central controller 12 where it is appropriately added to or subtracted from a count in a respective PRESENT POSITION REGISTER which represented the preexisting actual position of the seat before that motor operation began. The resultant count is representative of the updated actual position of the seat along or about the particular axis being controlled by the respective motor.

Upon arriving at a position which suits the operator, that position may be stored in memory as a "first" memory position by actuating the SET switch and, then, within a short predetermined time thereafter, the RECALL #1 switch. To set a second seat position which is to be remembered, selected ones of the eight control switches are actuated to move the seat to a second position, whereupon the SET switch and the RECALL #2 switch are actuated to store the second position. When the set switch and a RECALL #1 or #2 switch are actuated, the actual positions of each of the peripheral devices 32, 34, 36 and 38 are stored in their respective locations in memory. After either one or two seat positions have been stored in the memory of central controller 12, each may be recalled by actuating the appropriate switch, i.e. RECALL #1 or RECALL #2.

Assuming two different seat positions have been entered in M1 and M2, the control 10 operates to automatically move the seat from its present position, wherever, to the selected one of the two positions to be recalled by the operator actuating the appropriate one of the RECALL #1 or the RECALL #2 switches. At this point it is appropriate to note that during the original or any subsequent positioning of the seat by sustained actuation of one or more of the basic eight manual control switches, a flag is set in the main controller 12 when the switch is initially actuated to effect operation of the respective motor. The various inputs and outputs of the remuxes 14 in the control system 10 are sequentially and repetitively polled by the central controller 12 at a repetition rate which is sufficiently fast to detect even the briefest of manual actuations of a switch. Once a particular switch is actuated, a flag is set in the central controller 12 and a corresponding motor drive signal is applied to the appropriate remux output for driving the appropriate motor. That output control signal continues until manual pressure is released and the particular switch returns to its normally-open position. It will be appreciated that this mode of operation does not unduly tax the time-shared commitment of the central controller 12 to the various remuxes 14 and their respective inputs and outputs.

On the other hand, when it is desired to move the seat from a present position to one of the positions stored in memory, that result is automatically obtained simply by momentarily actuating the appropriate one of the RECALL #1 and the RECALL #2 memory switches. It will be appreciated that because this normally only involves a momentary closure of the appropriate RECALL SWITCH, rather than requiring its continued actuation until the stored seat position is attained, there would appear to be no way of determining when that position is attained unless the position pulses from the appropriate drive mechanism position sensors are being continuously inputted to the central controller via Remux 2. However, as earlier mentioned, that would require a complete dedication of the serial bus 15 for a time greater than or equal to the actual real time movement associated with the particular peripheral device. Obviously, that degree of dedication would be unacceptable because communication between other devices in the control system 10 would then be impossible during that time.

According to the invention, however, provision is made for commanding operation of an appropriate motor or motors in respective appropriate directions when RECALL #1 or RECALL #2 switch is actuated. The operation of the respective motors continues for respective intervals which are estimated or approximated to move the seat to the requested memory position. That operation is determined by comparing the present position of the appropriate seat drive mechanism with the desired position of that mechanism stored in the appropriate memory. Any resulting difference, and the arithmetic sense of that difference, i.e. positive or negative, are then used to determine the direction of rotation of the appropriate motor and for setting a time to measure the estimated interval for which the motor is to run. Upon completion of that interval, a command is sent to the appropriate output of the Remux 2 to terminate, at least temporarily, operation of the motor. Additionally, the resulting count accumulated in the appropriate counter 132, 134, 136 or 138 is then entered, via Remux 2, into the appropriate TEMPORARY REGISTERS in central controller 12. That count is representative of the magnitude of displacement of the motor and thus the associated drive mechanism during that particular run of the motor. That value is then added to or subtracted from the last "present" position value stored in the appropriate PRESENT POSITION REGISTERS so as to update the contents of the respective PRESENT POSITION REGISTER to accurately represent the actual "present" position of the respective drive mechanism. Whether the value in the TEMPORARY REGISTER is added to or subtracted from the PRESENT POSITION REGISTER is determined by the same flag which was set to determine the direction in which the respective motor was to rotate in order to satisfy the difference between a selected memory position and the "present" position.

Next, the recently updated "present" position is again compared with the target position contained in the selected memory position being recalled. If the difference between those two values is within some acceptable tolerance band, i.e. approximately plus or minus eight counts, no other serial command is sent to move the motor. On the other hand, if the difference exceeds that acceptable tolerance band, it is necessary to reset the TIMER for a new, and presumably shorter, interval estimated to provide the time necessary for the motor to move the mechanism to the target position. It will be understood that the direction of motor displacement may be opposite that of the previous run if some overshoot had occurred. The appropriate output port of Remux 2 is set to a logic 1, again generating another reset pulse for resetting the appropriate counter, and the corresponding motor is run for the newly-set interval. This sequence of operation is repeated until the updated "present" position is within the acceptable tolerance band with respect to the desired memory position. In the event an output command is issued to operate a motor, yet the resulting accumulated count in the associated 12-bit counter is zero, this is interpreted as a stall condition and no further movement command is sent.

The basic determination of the run interval is accomplished by using the different count between the PRESENT POSITION REGISTER and the desired memory position as a measure of the distance remaining to be traveled. Assuming the peripheral device has a travel speed of some approximately known value, the desired run time or interval is determined by dividing that speed into that remaining distance. The TIMER measures that interval by loading an appropriate count thereinto and then decrementing it to zero at an appropriate clock or stepping rate. In the present embodiment, the clock for the TIMER is the system non-maskable interrupt, NMI, which recurs every 20 ms. Also, one revolution of the motor requires about 26 ms and serves to generate four input counts, i.e. one each 6.5 ms. Thus, it has been found convenient to divide the aforementioned count representing the distance remaining by a divisor value of about three, and entering the quotient as the preset count in the TIMER.

Referring to FIG. 5 there is illustrated a flow diagram which generally depicts the control routine associated with the inventive portion of the aforedescribed process. The routine is depicted for control of a single motor and drive mechanism, however, it will be appreciated that it is similarly applicable to a pluraity of motors and drive mechanisms. The routine is entered at 150 and determines whether the "down" timer is enabled at 152. If it is, this implies that the motor is running to effect a recalled memory seat position, and a return is made to the main routine. If the "down" timer were not enabled, it is determined at 154 whether the particular memory operation has been completed by attaining the target position and if it has, a return is made to the main routine. If the memory operation has not been completed, it is determined at 156 whether this particular request is a MEMORY #1 RECALL and if not, then at 158 an instruction is used to use MEMORY #2. Thereafter, using the appropriate MEMORY #1 or MEMORY #2, the value accumulated by the counter associated with Remux 2 is first entered into the TEMPORARY REGISTER and thence is used to adjust the value of the actual or "present" position of the motor at 160. A determination is made at 162 whether the motor position after the preceding step equals its starting point and if so, then the motor is presumed to be stalled at 164 and a "stalled" flag is set and a return is made to the main routine. Assuming the actual motor position differs from its starting point, thus implying that displacement did occur, the updated actual motor position is compared with the selected memory position. At 168 it is determined whether the updated actual motor position and the memory position are equal and if they are, the motor has atained the desired memory position and a "memory operation complete" flag is set at 170 and a return is made to the main routine. If they are not equal at 168, a determination is made at 171 whether the diffeence is within the tolerance band of plus or minus eight counts and if it is, a "memory operation complete" flag is set at 172 and a return is made to the main routine. If a NO determination is made at 171, then a determination is made at 174 whether the greater-than-eight difference is an undershoot condition. If it is, a "positive direction" flag is set at 176; the routine is called at 178 which calculates the correct run time interval; the down timer is then preset at 180 with the calculated correct run time value and it is then enabled; and a serial command is then set at 182 to run the appropriate motor in the "plus" direction and a return is made to the main routine. If it had not been an undershoot condition at 174, a "negative direction" flag would have been set at 184; the routine for calculating the correct run time would have been called at 186; the down timer would have been preset at 188 with the correct value and then enabled; a serial command would be set at 190 to run the motor in the "minus" direction and a return would then be made to the main routine.

In accordance with a further aspect of the invention, it may at times be necessary to allow movement of a peripheral device, i.e. 32, for a time greater than that using basic fixed assumptions. This situation arises through the variable physical loading and "overloading" which may be present on the respective motor, i.e. 44. In the situation where different weight-loads on a seat result in a slower rate of displacement of the peripheral device than anticipated, the number of times the motor is stopped and started to finally attain the targeted memory position would increase. This would create a need for a greater number of serial transactions between the central controller 12 and the Remux 2 and would result in a number of stop-and-start motions which would be inconsistent with "natural" axis movement. However, such effects caused by differences in physical loading of the seat may be compensated for by use of the pressure transducer 65. The pressure transducer 65 senses the weight-load imposed on the seat by a person or other object, and the resulting analog value is translated to a three digit binary code which is applied to the inputs BI$_4$, BI$_5$, and BI$_6$ of Remux 2. That code is capable of representing eight different load ranges and the resulting load value is transmitted from Remux 2 to the central controller 12. This value of seat load is utilized in the central controller 12 to modify the divisor used in the calculation of the running time interval which is loaded into the down timer.

In a typical situation, the calculation of the running time interval may be made assuming a "no-load" condition, and the detection of load and the corresponding value of that load are then used to increase the running time interval accordingly. Of course, it will be understood tht the basic calculation of a run time interval might be made with the assumption that a 160 pound load is on the seat. Accordingly, a different load detected by transducer 65 will serve to either extend or reduce that run time interval, depending upon the actual load.

Figure 6:
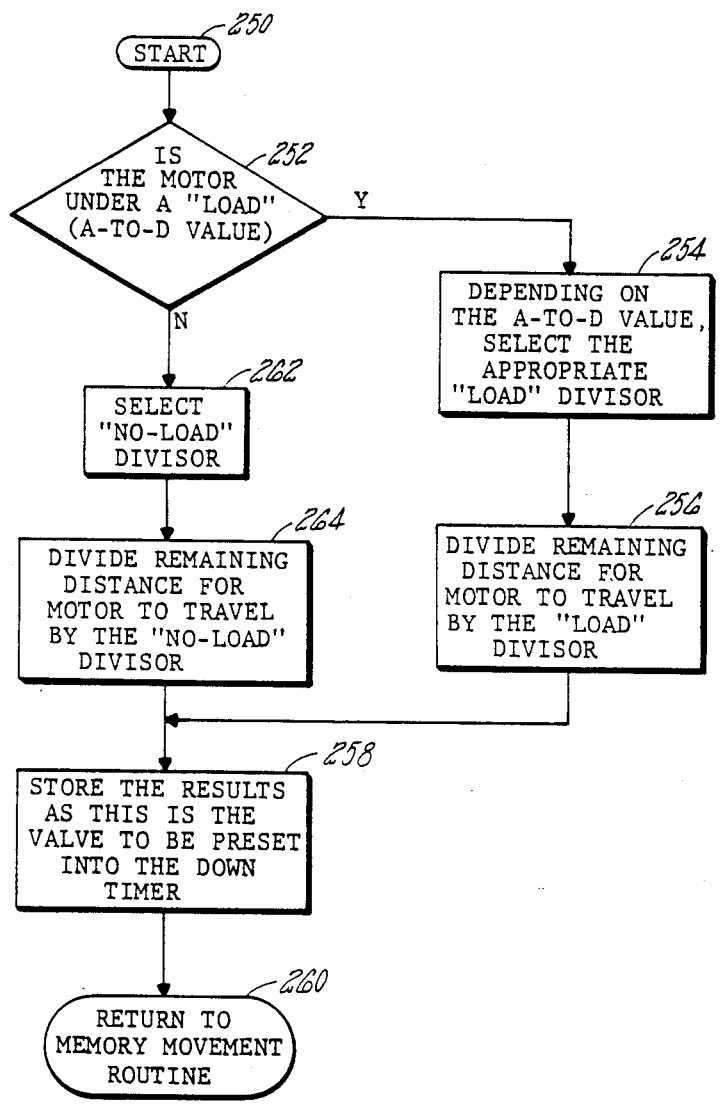
FIG. 6 is a flow diagram of a routine to compensate for changes in the weight on the seat, in accordance with one embodiment of the invention.

Referring to FIG. 6, there is disclosed a flow diagram which depicts the routine for compensating or adjusting the run time interval as a function of variations in the weight-load on the seat. The routine is entered at 250 and a determination is made at 252 whether the respective motor is operating under a load, as implied by detection of a sensed weight on the seat. If it is, a determination is made of the appropriate load range and the appropriate "load" factor or divisor is selected at 254.

At 256 that "load" divisor is used in determining the count to be used to preset the down timer. The resulting value is stored at 258 for use in presetting the down timer and a return is made at 260 to the memory movement routine. Had it been determined at 252 that the motor was not under a load, a "no-load" divisor would be selected at 262, and at 264 that "no-load" divisor is used in determining the count to be used to preset the down timer and the block 258 is then entered. In the illustrated embodiment, a single pressure transducer 65 will suffice to provide the load-dependent divisor used for all of the peripheral devices 32, 34, 36 and, possible also for the recliner seat drive 38.

Figure 7:
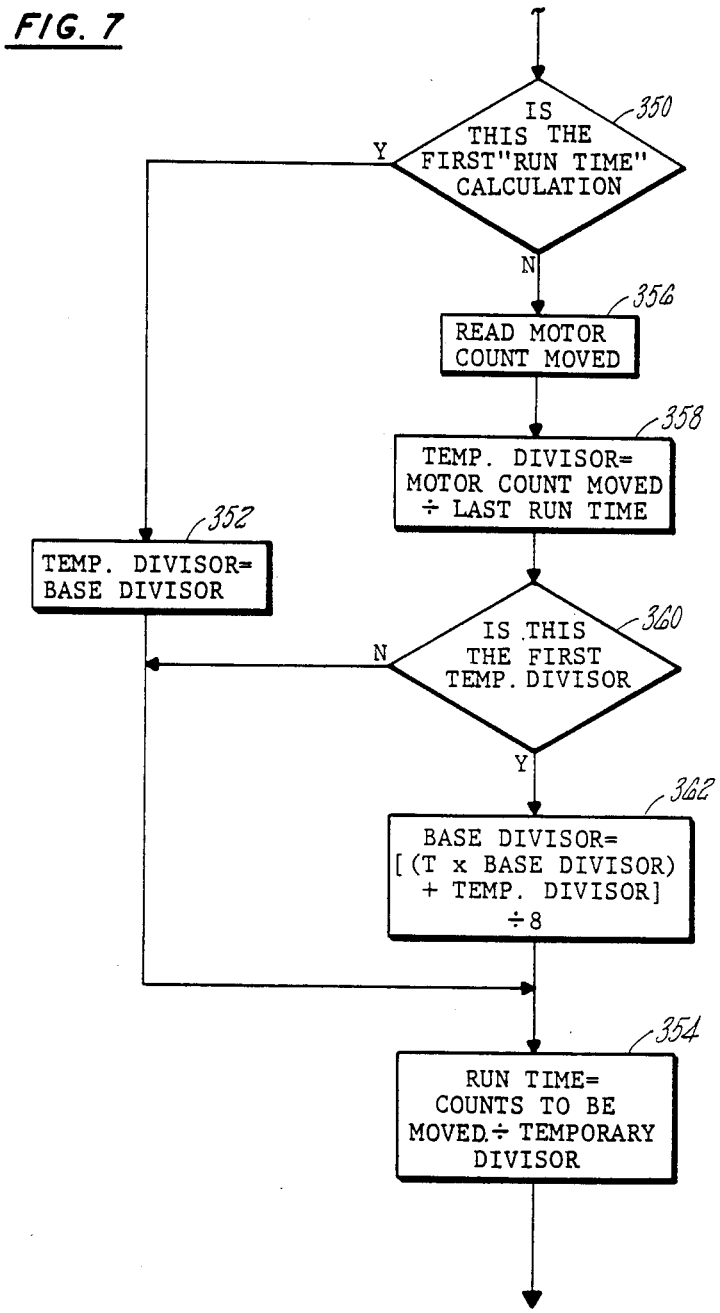
FIG. 7 is a flow diagram of a routine to compensate for changes in seat motor speed occasioned by various factors, in accordance with a further embodiment of the invention.

The flow diagram depicted in FIG. 7 is a routine which provides compensation in a manner which is an alternative to that depicted in FIG. 6. While the weight-load on the seat resulting from its occupancy by different persons may occasion significant and short-term modifications to the response rate of the seat, other factors may also contribute to variations of smaller amplitude and/or which occur over a much longer period. Examples of these factors include changes in motor voltage, long-term wear in the bearings and other mechanical elements associated with the seat drive mechanism and the ambient temperature. In some instances these factors may increase the motor speed, although normally they will tend to decrease that speed such that the response rate of the seat is correspondingly slowed. In accordance with this alternate provision of compensation for variations in motor speed, all variables that affect that motor speed are taken into account. As in the preceding embodiment, the adjustment factor will be described in the context of a variable divisor, however, as there, it will be appreciated that it might also be another appropriately scaled mathematical operator. The initial calculation of the interval required for a movement of the seat mechanism to a targeted memory position is accomplished using a "base" divisor.

As in the previous examples, the calculated run time, or interval, is a value represented by the number of motor pulses between the present position and the target position, and divided by a divisor. The base divisor is representative of an average adult load, typical battery voltage, and average motor characteristics. After the motor has run for the first calculated run time, it is stopped and its movement is read from the appropriate counter via the serial bus 15. A new temporary divisor is determined by dividing the run time just completed by the count of motor pulses accumulated during that run. This new temporary divisor is then used to determine the next run time or interval, estimated for the seat mechanism to attain the selected memory seat position.

In this manner, each new determination of a run interval is based on actual run data and thus, the seat mechanism speed developed in the immediately preceding runs. This permits the new calculation to take into account the present condition of the seat-speed variables. The first temporary divisor is then averaged into the initial, or base, divisor to form a new, or updated, base divisor. The averaging of the temporary divisor into the base divisor is done on a weighted basis in which the temporary divisor has a ratio of 1:8 with respect to the base divisor. This allows the base divisor to slowly approach the value necessary to accommodate the motor characteristics, the battery voltage, and loading.

In a seat positioning sequence which may involve several separate runs of a particular motor before the targeted position is finally attained, only the first temporary divisor is used for averaging with the base divisor, since it will have the least amount of error because it was determined with the longest motor run time. Each successive run time should be substantially shorter and is determined using new temporary divisors based on run speed data resulting from the immediately past run. This provides some compensation for motor start-up time which will become a larger percentage of an individual run time as the pulse count of the motor to be moved decreases. The next tie a RECALL #1 or RECALL #2 switch is actuated, the updated base divisor is used in determining the first run time interval for attaining the selected memory seat position. It will be understood that a single divisor might be utilized in the interval-time determinations for each of the several motors used to position the seat, however varitions in the characteristics of the individual seat drive mechanism and motors may be accommodated by the provision of separate divisors for each.

Referring to FIG. 7, the flow diagram depicts a routing which begins at 350 with a determination of whether the present run-time calculation is the first following acutation of a RECALL switch. If it is, the existing base divisor is treated as the temporary divisor for the present run time calculation, as at 352 and the run-time, or interval, is determined at 354 by determining the number of motor pulse counts required to attain the target position and dividing that value by the temporary divisor. On the other hand, if the present run-time calculation is not the first in a sequence of runs necessary to attain the targeted position, the appropriate counter is read at 356 to determine the motor pulse count accumulated during the motor run just completed and, at 358, the temporary divisor is set to the quotient resulting from dividing the motor count just moved by the last run time, or interval. At 360 it is determined if this temporary divisor is the first in this memory positioning sequence and if not, the routine moves directly to the functional block 354. On the other hand, if the temporary divisor determined at 358 had been determined to be the first temporary divisor at 360, then at block 362 the value of the base divisor would be updated by averaging it on a weighted basis with the first temporary divisor just determined. Thereafter the routine would move to step 354.

Although this invention has been shown and described with respect to detailed embodiments thereof, it will be understood by those skilled in the art that various changes in form and detail thereof may be made without departing from the spirit and scope of the claimed invention.

Having thus described a typical embodiment of the invention, that which is claimed as new and desired to secure by Letters Patent of the United States is:

1. In a control system having a central controller, a plurality of peripheral devices operatively connected in communication with said central controller and input and output signals being provided between said central controller and various ones of said plurality of peripheral devices, a first one of said peripheral devices including a motor for varying a characteristic of said device in a time-dependent manner in response to an output signal from said central controller, means for providing signals indicative of variations in said characteristic of said first one of said peripheral devices, the central controller including memory means for storing a target value and an actual value of said variable characteristic of said first one of said peripheral devices, an other one of the peripheral devices being manually actuable to provide a recall input command signal and said central controller including means responsive to said recall input command signal for providing said output signal to said motor of said first one of said peripheral devices for varying said characteristic thereof in a manner to attain said target value stored in said memory means, the improvement wherein the control system further comprises:

one or more remote controllers connected to the central controller by a serial multiplex data link, each of said plurality of peripheral devices being connected to said central controller via said remote controllers, and said central controller means being responsive to said recall input command signal for comparing said actual value with said target value of said variable characteristic to determine a difference value, for determining an interval which approximates the time required for said motor to vary said device variable characteristic by said difference value, and for applying said output signal to said motor for the duration of said interval by latching said output signal at said remote controller.

2. The control system of claim 1 further including means responsive to said signals indicative of variations in said characteristic of said first peripheral device for providing a signal representative of the value of the variations in said characteristic accumulated during said central controller-determined interval, said accumulated variation signal being applied to said central controller via a respective said remote controller following expiration of said interval and wherein said central controller is responsive to said accumulated variation signal for updating said actual value of said variable characteristic stored in said memory means.

3. The control system of claim 2 wherein said central controller is responsive to said updating of said actual value of said variable characteristic for repeating said determination of said difference value and if said difference value exceeds a threshold, for repeating said determination of said interval and for repeating said application of said output signal to said motor until said difference value no longer exceeds said threshold.

4. The control system of claim 3 wherein said first peripheral device comprises a bidirectional positioning mechanism for an automobile seat.

5. The control system of claim 4 additionally including second and third said peripheral devices, said second and third peripheral devices each comprising separate said bidirectional positioning mechanisms for said automobile seat, each of said first, second and third peripheral devices operating to control a respective different mode of the position of said automobile seat, said memory means storing respective said target values and respective said actual values of said variable characteristic for each of said first, second and third peripheral devices; and wherein said central controller is responsive to said recall input command signal for comparing said actual values with said target values of said variable characteristic to determine respective difference values for each of said first, second and third peripheral devices for determining respective said intervals for each of said first, second and third periperhal devices and for applying respective said output signals to the respective motors of said first, second and third peripheral devices.

6. The control system of claim 1 wherein said central controller determines said interval dependent upon a preselected rate at which said motor is presumed to vary said device characteristic, said preselected rate being constant.

7. The control system of claim 4 including means for sensing the magnitude of a weight on the seat associated with said positioning mechanism and providing a signal which varies as a function of said sensed weight, said central controller determining said interval dependent upon a preselected rate at which said motor is presumed to vary said device characteristic and being responsive to said weight signal to adjust said rate as a function of said sensed weight signal.

8. The control system of claim 7 wherein one of said plurality of peripheral devices comprises said seat weight sensing means and said seat weight signal is connected to said central controller via one of said remote controllers.

9. The control system of claim 3 wherein said central controller determines said interval dependent upon a presumed rate at which said motor varies said characteristic, said rate initially being a predetermined base value, said central controller being responsive to said accumulated variation signal which occurs during said interval for determining a temporary actual rate value; and wherein each succeeding interval required to be determined by said central controller to bring said device characteristic to within said threshold value is dependent upon the respective temporary actual rate value determined based on the immediately preceding interval during which the motor was run.

10. The control system of claim 9 further including a first said temporary actual rate value determined following each said recall input command signal, said first temporary actual rate value being averaged with said base rate value to thereby adjust said base rate value prior to a subsequent said recall input command signal.

11. The control system of claim 2 wherein said central controller determines said interval dependent upon a rate at which said motor is presumed to vary said characteristic, said rate initially being a predetermined base value, said central controller being responsive to said accumulated variation signal occurring during said interval for determining a temporary actual rate value, and said temporary actual rate value being averaged with said base rate value thereby to adjust said base rate value.

12. The control system of claim 11 wherein said temporary actual rate value is weighted prior to averaging with said base rate value so as to give dominance to said base rate value.

13. The control system of claim 2 wherein said means for providing said signal representative of the value of the accumulated variation of the characteristic comprises a counter, and further including means responsive to the occurrence of said output signal for generating a reset signal at the beginning of said output signal occurrence, said reset signal being applied to said counter.

14. In a control system having a master controller, a plurality of peripheral devices operatively connected in communication with said master controller and input and output signals being provided between said master controller and various ones of said plurality of peripheral devices, a first one of said peripheral devices including a motor for varying a characteristic of said device in a time-dependent manner in response to an output signal from said master controller, means for providing signals indicative of variations in said characteristic of said first one of said peripheral devices, the master controller including memory means for storing a target value and an actual value of said variable characteristic of said first peripheral device, an other one of the peripheral devices being manually actuable to provide a recall input command signal and said master controller including means responsive to said recall input command signal for providing said output signal to said motor of said first one of said peripheral devices for varying said characteristic thereof in a manner to attain said target value stored in said memory means, the improvement comprises:

said master controller being responsive to said recall input comand signal for comparing said actual value with said target value of said variable characteristic to determine a difference value, for determining an interval which approximates the time required for said motor to vary said device variable characteristic based on said difference value, and for causing said output signal to be applied to said motor during said interval.

15. The control system of claim 14 further including counter means responsive to said signals indicative of variations in said characteristic of said first peripheral device for providing count signal representative of the value of the variations in said characteristic accumulated over said master controller-determined interval, means responsive to the occurrence of said output signal for generating a reset signal at the beginning of said output signal occurrence, means for applying said reset signal to said counter means, means for applying said accumulated variation count signal to said master controller following expiration of said interval, and wherein said master controller is responsive to said accumulated variation count signal for updating said actual value of said variable characteristic stored in said memory means.

16. The control system of claim 15 wherein said master controller is responsive to said updating of said actual value of said variable characteristic for repeating said determination of said difference value and if said difference value exceeds a threshold, for repeating said determination of said interval and for repeating said application of said output signal to said motor until said difference value no longer exceeds said threshold.

17. The control system of claim 16 wherein said first peripheral device comprises a bidirectional positioning mechanism for an automobile seat.

18. The control system of claim 14 wherein said master controller determines said interval dependent upon a preselected rate at which said motor is presumed to vary said device characteristic, said preselected presumed rate being constant.

19. The control system of claim 17 including means for sensing the magnitude of a weight on said seat and providing a signal which varies as a function of said sensed weight, said master controller determining said interval dependent upon a preselected rate at which said motor is presumed to vary said device characteristic and being responsive to said weight signal to adjust said rate as a function of said sensed weight signal.

20. The control system of claim 16 wherein said master controller determines said interval dependent upon a presumed rate at which said motor varies said characteristic, said rate initially being a predetermined base value, said master controller being responsive to said accumulated variation signal which occurs during said interval for determining a temporary actual rate value; and wherein each succeeding interval required to be determined by said master controller to bring said device characteristic to within said threshold value is dependent upon the respective temporary actual rate value determined based on the immediately preceding interval during which the motor was run.

21. The control system of claim 20 further including a first said temporary actual rate value determined following each said recall input command signal, said first temporary actual rate value being averaged with said base rate value to thereby adjust said base rate value prior to a subsequent said recall input command signal.

22. The control system of claim 15 wherein said master controller determines said interval dependent upon a rate at which said motor is presumed to vary said characteristic, said rate initially being a predetermined base value, said master controller being responsive to said accumulated variation signal during said interval for determining a temporary actual rate value, and said temporary actual rate value being average with said base rate value thereby to adjust said base rate value for a difference in rate.

* * * * *